(12) United States Patent
Beuch et al.

(10) Patent No.: US 11,036,605 B2
(45) Date of Patent: Jun. 15, 2021

(54) FEEDBACK TUPLES FOR DETECTING DATA FLOW ANOMALIES IN STREAM COMPUTING ENVIRONMENT

(71) Applicant: International Business Machines Corporation, Armonk, NY (US)

(72) Inventors: Daniel Beuch, Rochester, MN (US); Michael J. Branson, Rochester, MN (US); John M. Santosuosso, Rochester, MN (US); Eric L. Barsness, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 15/901,226

(22) Filed: Feb. 21, 2018

(65) Prior Publication Data

US 2019/0258558 A1    Aug. 22, 2019

(51) Int. Cl.
*G06F 11/00* (2006.01)
*G06F 11/30* (2006.01)
*G06F 11/34* (2006.01)
*G06F 16/2458* (2019.01)
*G06F 16/2455* (2019.01)

(52) U.S. Cl.
CPC ...... *G06F 11/3065* (2013.01); *G06F 11/3476* (2013.01); *G06F 16/2474* (2019.01); *G06F 16/24568* (2019.01)

(58) Field of Classification Search
CPC .................. G06F 11/3065; G06F 11/3476
See application file for complete search history.

(56) References Cited

U.S. PATENT DOCUMENTS

| | | | |
|---|---|---|---|
| 8,887,286 B2 | 11/2014 | Dupont et al. | |
| 9,401,932 B2 | 7/2016 | Deerman et al. | |
| 2014/0043994 A1* | 2/2014 | Bansal | H04L 41/147 370/252 |
| 2014/0122559 A1* | 5/2014 | Branson | H04L 67/02 709/201 |
| 2014/0165207 A1 | 6/2014 | Engel et al. | |
| 2016/0217148 A1* | 7/2016 | Branson | G06F 16/24568 |
| 2016/0269247 A1* | 9/2016 | Chakradhar | H04L 67/12 |
| 2017/0063707 A1* | 3/2017 | Winters | H04L 41/12 |
| 2017/0132068 A1 | 5/2017 | Parra | |
| 2017/0269911 A1* | 9/2017 | Barsness | H04L 65/60 |
| 2019/0130904 A1* | 5/2019 | Homma | G10L 15/26 |

OTHER PUBLICATIONS

Dice Project; "Quality Anomaly Detection and Trace Checking Tools—Initial Version"; Developing Data Intensive Cloud Applications with Iterative Quality Enhancements; Jul. 2016.
IPCOM000239325D; "Optimizing In-Band Network-to-Application Feedback"; http://ip.com/IPCOM/000239325D; Oct. 29, 2014.
Anonymously; "Anomaly Detection on Multiple, Interdependent Data Sources"; http://ip.coml/IPCOM/000247943D; Oct. 13, 2016.

* cited by examiner

*Primary Examiner* — Katherine Lin
(74) *Attorney, Agent, or Firm* — Richard B. Thomas

(57) ABSTRACT

Feedback tuples are implemented in a stream computing environment to provide data flow status information for use in detecting, identifying and/or handling data flow anomalies for a stream computing application.

19 Claims, 8 Drawing Sheets

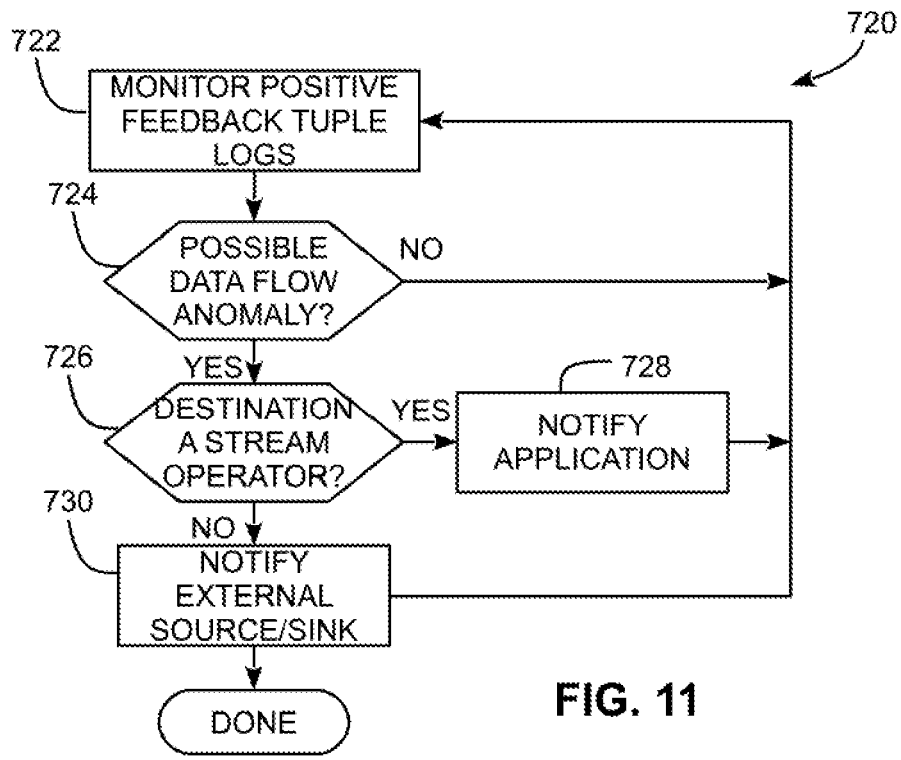
FIG. 11
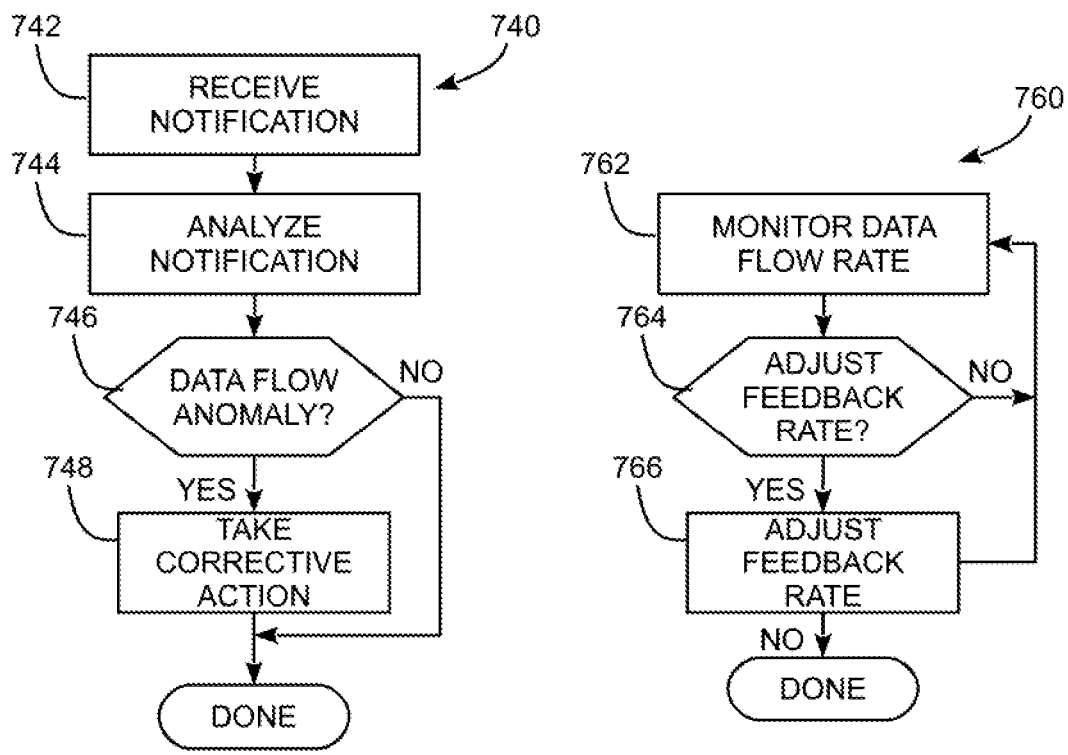
FIG. 12     FIG. 13

FEEDBACK TUPLES FOR DETECTING DATA FLOW ANOMALIES IN STREAM COMPUTING ENVIRONMENT

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product that utilize feedback tuples in a stream computing environment to provide data flow status information for use in detecting, identifying and/or handling data flow anomalies for a stream computing application.

Therefore, consistent with one aspect of the invention, a method of processing a stream of tuples in a stream computing environment may include receiving a stream of tuples to be processed by a plurality of stream operators organized into an operator graph and disposed in a plurality of processing elements operating on one or more computer processors, in a first stream operator among the plurality of stream operators, processing a plurality of data tuples received from the stream of tuples, and communicating a feedback tuple from the first stream operator to an upstream entity coupled to the operator graph to provide flow status information to the upstream entity.

In some embodiments, the upstream entity is a second stream operator among the plurality of stream operators. Also, in some embodiments, the upstream entity is immediately neighboring the first stream operator in the operator graph. Further, in some embodiments, the upstream entity is an external data source.

Some embodiments may further include communicating a second feedback tuple from the first stream operator to a downstream entity coupled to the operator graph to provide flow status information to the downstream entity. In some embodiments, the downstream entity is a second stream operator among the plurality of stream operators. In addition, in some embodiments, the downstream entity is immediately neighboring the first stream operator in the operator graph.

In some embodiments, the downstream entity is an external data sink. In addition, in some embodiments, the second feedback tuple is a dual use tuple including one or more attributes, and the method further includes processing the second feedback tuple as a data tuple with the downstream entity.

Moreover, in some embodiments, the feedback tuple includes a positive feedback tuple, and communicating the feedback tuple includes communicating a positive feedback tuple from the first stream operator to each upstream and downstream entity coupled to the operator graph and immediately neighboring the first stream operator. In some embodiments, communicating the positive feedback tuple includes communicating positive feedback tuples from the first stream operator to the upstream entity based upon a feedback rate, and the method further includes detecting a possible data flow anomaly for the upstream entity in response to a failure to timely receive a positive feedback tuple from the first stream operator. Moreover, in some embodiments, the feedback rate is configured to be substantially proportional to a flow rate for data tuples processed by the first stream operator.

Some embodiments may also include monitoring a flow rate for data tuples processed by the first stream operator, and dynamically adapting the feedback rate in response to the monitored flow rate. In addition, some embodiments may also include logging receipt of positive feedback tuples by the upstream entity and from the first stream operator.

In some embodiments, the feedback tuple includes a negative feedback tuple, and communicating the feedback tuple includes communicating a negative feedback tuple from the first stream operator to the upstream entity to indicate a possible data flow anomaly in response to monitoring of data flow between the first stream operator and the upstream entity. Some embodiments may further include detecting a possible data flow anomaly based upon the feedback tuple, notifying the upstream entity in response to detecting the possible data flow anomaly, determining whether an actual data flow anomaly exists with the upstream entity in response to notifying the upstream notification, and performing a corrective action with the upstream entity in response to determining that an actual data flow anomaly exists.

Also, in some embodiments, the flow status information is stored as metadata in the feedback tuple. In addition, in some embodiments, communicating the feedback tuple from the first stream operator to the upstream entity is performed by a stream runtime.

Some embodiments may also include an apparatus including a plurality of stream operators organized into an operator graph and disposed in a plurality of processing elements operating on one or more computer processors, and program code configured upon execution to perform any of the methods discussed herein. Some embodiments may also include a program product for processing a stream of tuples in a stream computing environment including a non-transitory computer readable storage medium having program code embodied therewith and configured to perform any of the methods discussed herein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 11 illustrates an example sequence of operations for monitoring positive feedback tuple logs with the computing infrastructure of FIG. 1.

FIG. 12 illustrates an example sequence of operations for handling notifications with the computing infrastructure of FIG. 1.

FIG. 13 illustrates an example sequence of operations for dynamically adapting a feedback rate with the computing infrastructure of FIG. 1.

Like reference numbers and designations in the various drawings indicate like elements.

DETAILED DESCRIPTION

Figure 1:
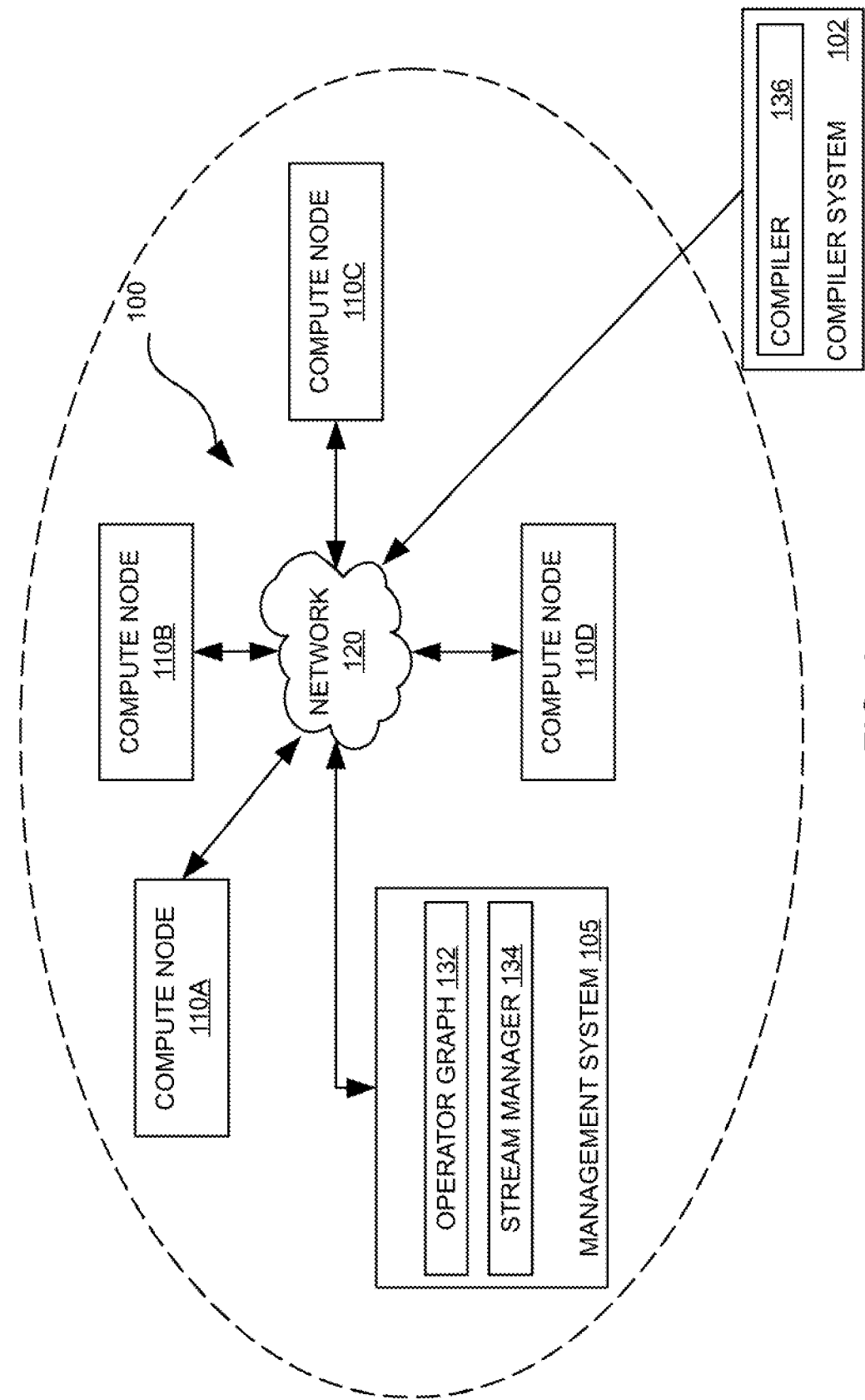
FIG. 1 illustrates a computing infrastructure configured to execute a stream computing application according to various embodiments.

Stream-based computing and stream-based database computing are emerging as a developing technology for database systems. Products are available that allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are generally connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability may be achieved by distributing an application across nodes by creating executables (i.e., processing elements), as well as replicating processing elements on multiple nodes and load balancing among them. Stream operators in a stream computing application can be fused together in some instances to form a processing element that is executable. Doing so allows processing elements to share a common process space, generally resulting in much faster communication between stream operators than is available using inter-process communication techniques (e.g., using a TCP/IP socket). Further, in some instances processing elements can be inserted or removed dynamically from an operator graph representing the flow of data through the stream computing application. In some instances, a particular stream operator may not reside within the same operating system process as other stream operators. In addition, stream operators in the same operator graph may be hosted on different nodes, e.g., on different compute nodes or on different cores of a compute node.

Data generally flows from one stream operator to another in the form of a "tuple," which may also be referred to herein as a "data tuple" to distinguish from the feedback-only tuples described herein. A tuple may be considered to be a sequence of one or more attributes associated with an entity. Attributes may be any of a variety of different types, e.g., integer, float, Boolean, string, etc. The attributes may also be ordered. In addition to attributes associated with an entity, a tuple may include metadata, i.e., data about the tuple. A tuple may be extended by adding one or more additional attributes or metadata to it. As used herein, "stream" or "data stream" may be considered to refer to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

One issue that may arise in some stream computing environments is that a stream computing application may continue to "run" successfully, even though some portion of the application may not be processing data. The executable components of an application may continue to run successfully on the compute nodes upon which they are deployed, encountering no exceptions or failures, but for some reason, the data flow through some or all of the application may have stopped. For example, an external data source may stop producing data or a network issue may have occurred and halted data flow from the external source into the application. As another example, an ingest operator may have lost its connection and failed to reestablish the connection. As yet another example, a deadlock condition may arise in the operator graph, e.g., due to a programming error or a portion of the application crashing and restarting and losing its state. As a result of these and other issues, data flow anomalies, e.g., interruptions in the flow of tuples or other data into or out of an application, or between stream operators within an application, whether intermittent or continuous, may sometimes occur in a stream computing application.

Regardless of the cause, it would be desirable to detect whenever such data flow anomalies occur so that the conditions causing such data flow anomalies can be rectified. This is especially true for stream computing environments running applications that are expected to run continuously (24×7×365) and with little human oversight. When data flow stops in such environments, the data flow anomalies may not be noticed for hours or even days in some cases unless someone happens to observe the data flow rates in an application.

Some stream computing environments support an ability to develop and run a monitoring program that may select some key portions of a stream computing application and poll for metrics over an API, or that alternatively may establish listeners for certain events. However, data flow anomalies generally do not generate events, and moreover, due to the nature of many stream computing applications, it may be difficult to determine whether an interruption in data flow is due to a data flow anomaly or just due to the fact that the data flow rate in the application happens to be zero for an instant or for a longer period of time.

Embodiments of this disclosure are therefore directed to a method, apparatus and program product that may enhance the ability of a stream computing environment to detect, identify and/or handle data flow anomalies, in particular through the use of feedback tuples that may be communicated upstream and/or downstream between entities such as stream operators, external data sources and/or external data sinks in an operator graph to communicate flow status information therebetween. As will become more apparent below, feedback tuples may be used in some embodiments to determine when data flow appears to have stopped in comparison to what is normal or expected for the application, and to do so in a comprehensive manner, i.e., to cover all parts of the application including external data sources and sinks, as well as the networks that connect them to the application, given that data flow anomalies can conceivably occur at numerous points in a stream computing application.

In some embodiments, for example, a stream of tuples to be processed by a plurality of stream operators organized into an operator graph and disposed in a plurality of processing elements operating on one or more computer processors may be received, and in a first stream operator among the plurality of stream operators, a plurality of data tuples received from the stream of tuples may be processed. In addition, one or more feedback tuples may be communicated from the first stream operator to a second stream operator that is upstream from the first stream operator in the operator graph. Further, in some embodiments, one or more feedback tuples may also be communicated from the first stream operator to a third stream operator that is downstream from the first stream operator in the operator graph, and moreover, in some embodiments, feedback tuples from upstream and/or downstream stream operators may be monitored in order to detect, identify and/or handle data flow anomalies in a stream computing application. In some embodiments, for example, such monitoring may be performed to detect a deviation from an expected flow rate for a stream computing application, and in some embodiments, the expected flow rate may be determined adaptively. Other aspects of feedback tuples and their use in connection with detecting, identifying and/or handling data flow anomalies will become more apparent from the description below.

Now turning to the Drawings, wherein like parts are denoted by like numbers throughout the several views, FIG. 1 illustrates one example computing infrastructure 100 that may be configured to execute a stream computing application, according to some embodiments. The computing infrastructure 100 includes a management system 105 and two or more compute nodes 110A-110D—i.e., hosts—that are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
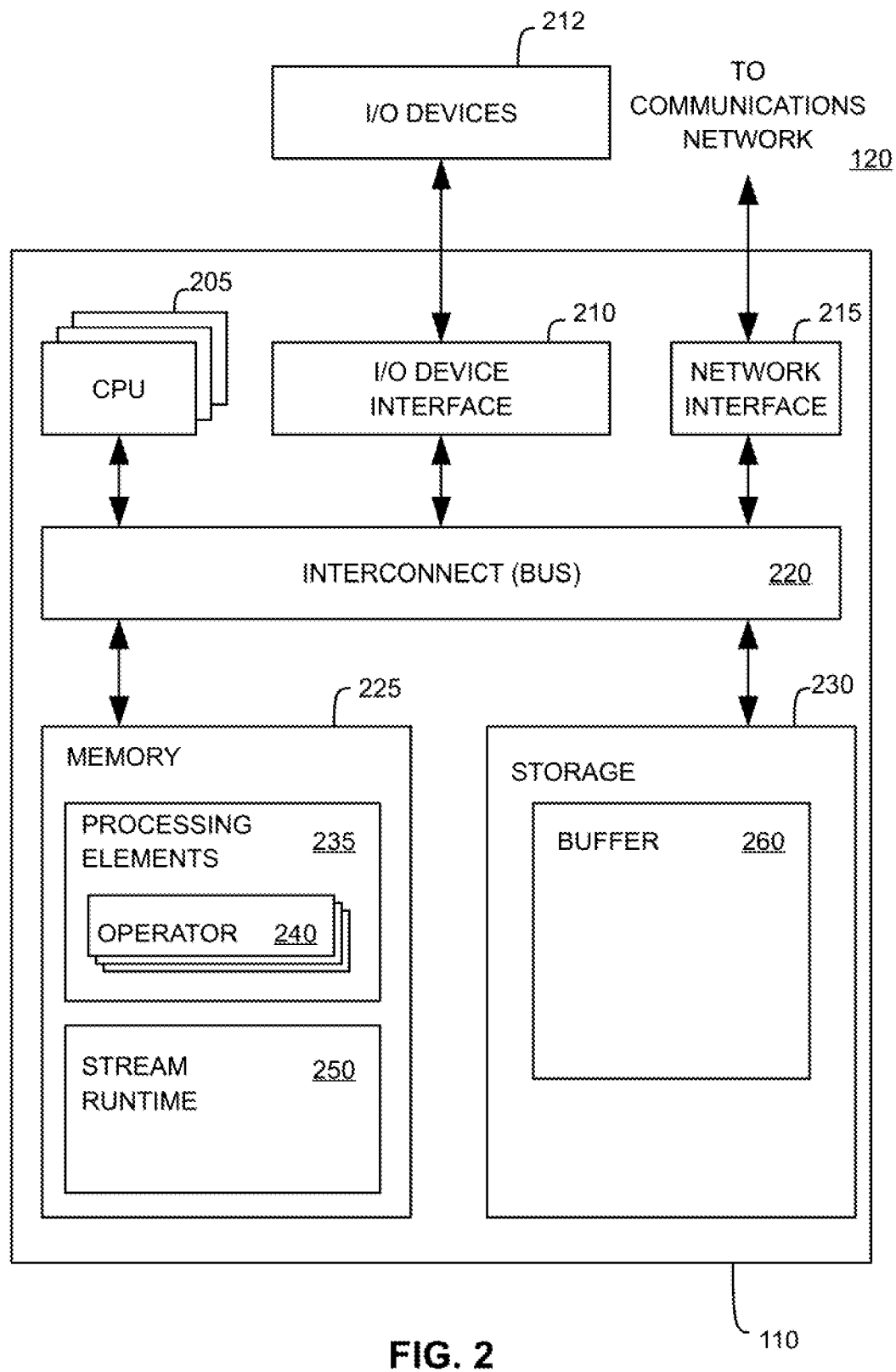
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems (not shown), which may be stored partially in memory 225 and partially in storage 230. Alternatively, an operating system may be stored entirely in memory 225 or entirely in storage 230. The operating system may provide an interface between various hardware resources, including the CPU 205, and processing elements and other components of the stream computing application. In addition, an operating system provides common services for application programs, such as providing a time function.

The compute node 110 may also include a stream runtime 250, which may partially or completely incorporated into an operating system in some embodiments, while in other embodiments may be separate from the operating system. In some embodiments, portions of the stream runtime may also be incorporated into a processing element 235 and/or a stream operator 240. Stream runtime 250 may provide stream-related services and/or functionality to assist with the communication and processing of tuples, as well as other stream-related activities including, for example, the generation, communication and/or handling of feedback tuples as described herein. In some embodiments, a stream runtime may also reside on non-compute nodes, e.g., on a management system.

Figure 3:
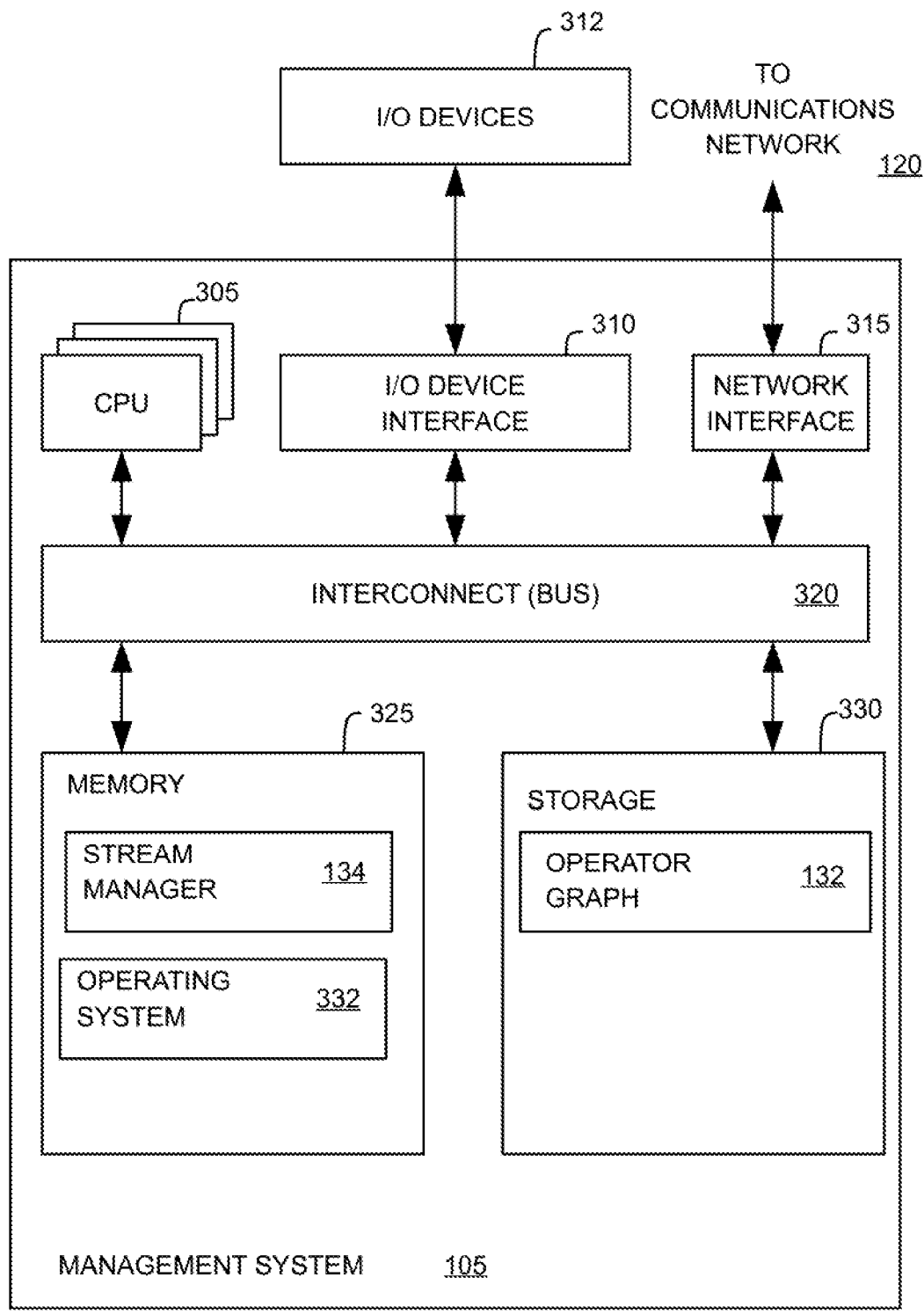
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may also include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
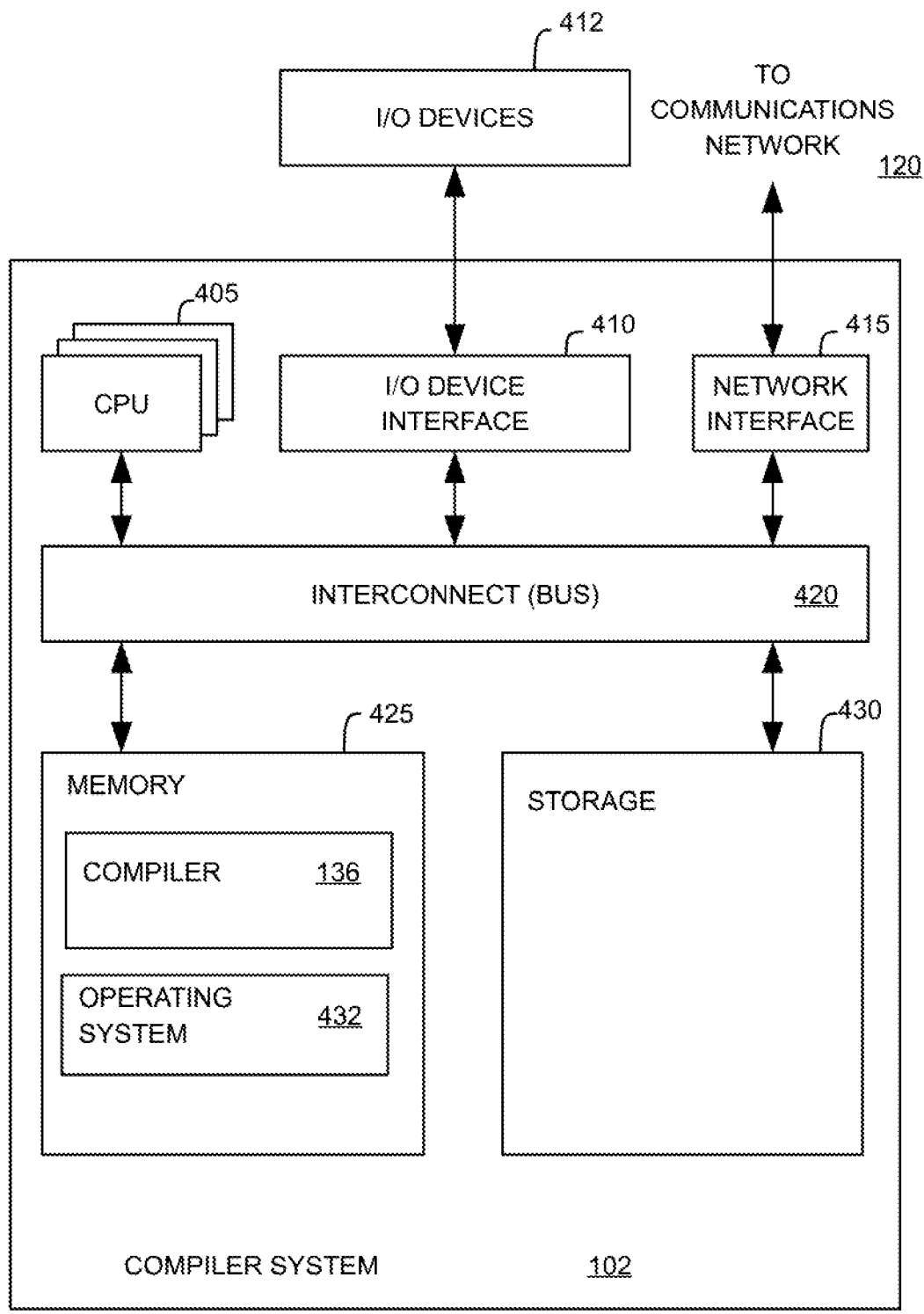
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
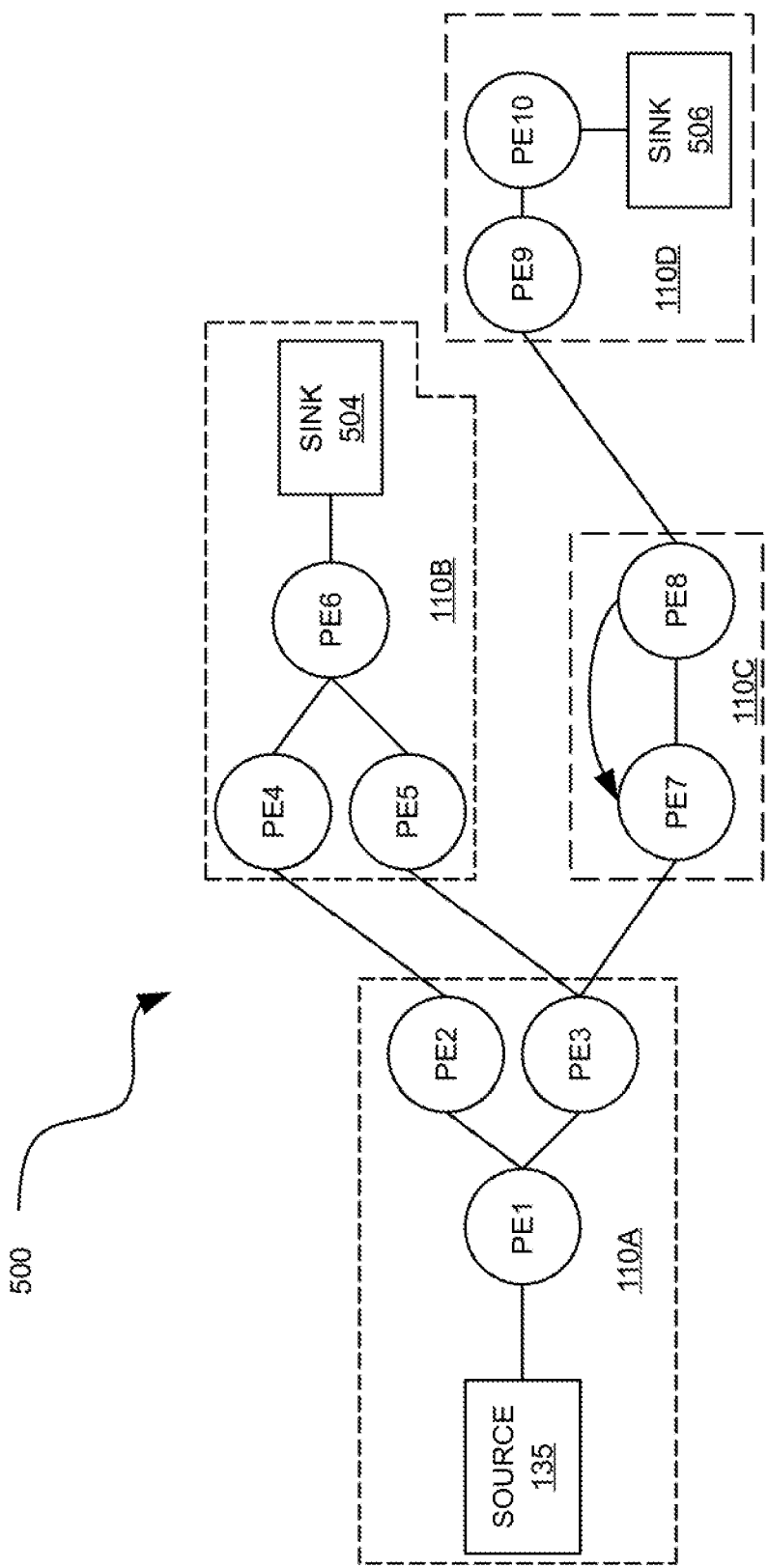
FIG. 5 illustrates an operator graph for a stream computing application according to various embodiments.

FIG. 5 illustrates an example operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

As noted above, feedback tuples may be incorporated into a stream computing environment such as illustrated in FIGS. 1-5 to assist in the detection, identification and/or handling of data flow anomalies in a stream computing application. In the embodiment discussed hereinafter for example, data flow anomalies in a stream computing application are detected between stream operators as well as between stream operators and external data sources and between stream operators and external data sinks (all of which may be considered to be entities for the purposes of this disclosure). However, in other embodiments, data flow anomalies may be monitored for only a subset of the entities in a stream computing application (e.g., only between stream operators). Moreover, in the embodiment discussed hereinafter, feedback tuples are communicated both upstream (i.e., in a direction opposite the flow of data tuples) and downstream (i.e., in the same direction as the flow of data tuples), although in other embodiments, feedback tuples may only be communicated upstream or downstream. In addition, for the purposes of this disclosure, two entities in a stream computing application may be considered to be immediately neighboring one another if no other entity is interposed between the two entities in the operator graph.

A feedback tuple, consistent with the disclosure, is a type of tuple that is communicated to or from a stream operator within a stream computing application (e.g., between two stream operators, between a stream operator and an external data source, or between a stream operator and an external data sink), and is used to communicate flow status information for the purpose of detecting, identifying and/or handling data flow anomalies. In some embodiments, a feedback tuple may be communicated in essentially the same manner as and at least partially utilizing the same functionality as is used to communicate data tuples in a stream of tuples. Thus, in some embodiments feedback tuples may be considered to be incorporated into a stream of tuples processed by a stream computing application, rather than as separate messages, interrupts, events or other sideband communications that may exist in a stream computing environment. In other embodiments, however, feedback tuples may be configured using various types of communications between stream operators, external data sources and/or external data sinks, and may be handled by functionality that is separate from that which communicates data tuples in a stream computing environment. Further, in some embodiments, feedback data tuples may be communicated to or from stream operators in essentially the same manner as data tuples, while feedback tuples communicated to or from external data sources or data sinks may be communicated using different protocols supported by those entities. In some embodiments, for example, a feedback tuple communicated to an external data source may include a notification back to an external data source using the protocol supported by that data source, and may include establishing a network connection back to the source to send the notification.

Figure 6:
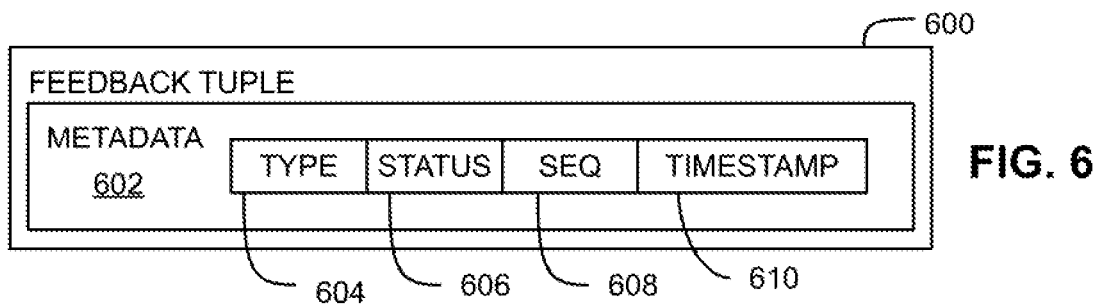
FIG. 6 illustrates an example data structure for a feedback tuple for a stream computing application according to various embodiments.

FIG. 6 illustrates an example data structure for a feedback tuple 600 including metadata 602, which generally defines the type and/or schema for the tuple, along with providing other characterizing information such as a unique identifier, performance data, age data, etc. Feedback tuple 600 in the context of this disclosure is also referred to as a feedback-only tuple insofar as the tuple does not also operate as a data tuple.

Metadata 602 may include a type field 604 that identifies the tuple as a feedback tuple to distinguish the feedback tuple from a data tuple, and that in some instances may also identify a type of feedback tuple, e.g., a forward feedback tuple that has been propagated downstream, a reverse feedback tuple that has been propagated upstream, a positive feedback tuple that has been propagated as part of normal processing, and/or a negative feedback tuple that has been propagated specifically in response to an adverse event detected in the system. In other embodiments, different types of feedback tuples may not be separately identified.

A status field 606 may be included in some embodiments to include flow status information, e.g., in the case of a negative feedback tuple, information describing an adverse event. In some instances, the feedback tuple itself may be considered to represent flow status information (as the failure to receive a feedback tuple within some threshold may itself be indicative of a data flow anomaly), so no additional flow status information may be maintained in a status field in some feedback tuples.

A feedback tuple may also include identification information to uniquely identify the feedback tuple, e.g., using a sequence field 608 that includes a sequence number for the feedback tuple and/or a timestamp field 610 that includes a timestamp for the feedback tuple. Additional information, e.g., an identification of one or more stream operators, processing elements, compute nodes, etc. that originated the feedback tuple, or practically any other information suitable for use in detecting, identifying, diagnosing or otherwise handling a data flow anomaly in a stream computing system may be included in various embodiments. The types of information that may be included in a feedback tuple as well as the manner in which such information may be organized in a feedback tuple may vary considerably in various embodiments, and thus the invention is not limited to the particular information discussed herein. For example, flow status information may be stored as attributes rather than metadata in some embodiments.

Figure 7:
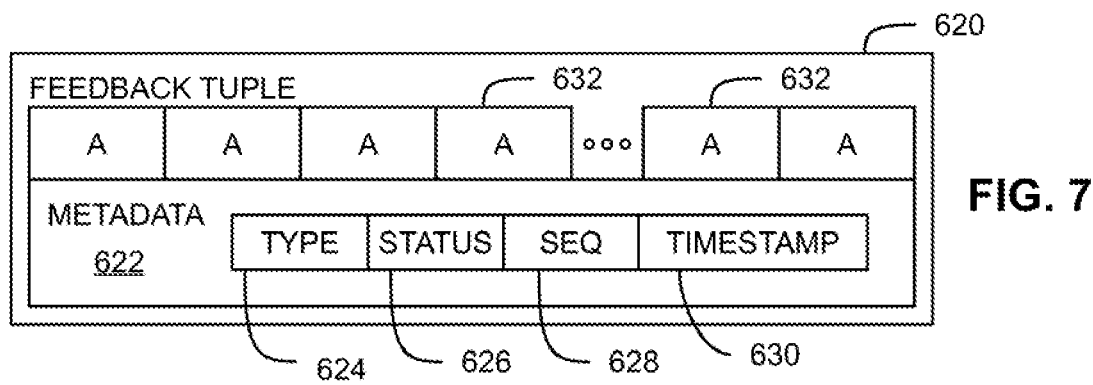
FIG. 7 illustrates another example data structure for a feedback tuple for a stream computing application according to various embodiments.

In addition, as illustrated in FIG. 7, in some embodiments a feedback tuple may be a dual use tuple that also operates as a data tuple, i.e., such that the information associated with a feedback tuple is incorporated into a data tuple that is utilized in the normal data flow of a stream computing application. As such, a feedback tuple 620 of this sort may include, in addition to metadata 622 (including type, status, sequence and timestamp fields 624, 626, 628 and 630 that may be configured similar to fields 604-610 of feedback tuple 600), one or more attributes 632. Each attribute 632 may have an associated data type, e.g., integer, float, Boolean, string, etc., and attribute 632 may also be ordered in some embodiments. Attributes 632 generally represent the data processed by stream operators of a stream computing application, and thus can vary considerably depending upon the stream computing application.

As noted above, a number of different types of feedback tuples may be used in different embodiments. Positive feedback tuples, for example, may be used as a low overhead technique to enable any or all relevant entities in a stream computing environment (e.g., stream operators, external data sources and/or external data sinks) to be aware of the status of data flow over a stream. As data flows across a stream, positive feedback tuples may be sent in both directions (upstream and downstream) from the stream to the relevant entities (i.e. to the sending entity and the receiving entity) as a way to communicate status of data flow, such that a failure to receive an expected positive feedback tuple may be an indicator of a data flow anomaly.

As will become more apparent below, positive feedback tuples are generally not 1:1 acknowledgements of every data tuple that flows across a stream. Instead, in some embodiments positive feedback tuples may be considered to be substantially regular notifications that are sent at a rate proportional to a tuple flow rate (e.g., one feedback tuple per every 100,000 tuples that flow across the stream). In some embodiments, and as discussed in greater detail below, the feedback tuple proportion or rate may be selected based upon an expected or normal flow rate over a stream, and in some embodiments, may be overridden by an application owner if desired. Thus, positive feedback tuples may be used in some embodiments to effectively enable sending and receiving entities to know that the stream between them is functioning normally, or otherwise in an expected manner.

Another type of feedback tuple that may be used in some embodiments is a negative feedback tuple, which may be used to inform entities in a stream computing application that a data flow anomaly has occurred or is occurring. For example, if no data flow across a stream is detected over a defined time interval, a negative feedback tuple may be generated and sent in both directions from the stream to the relevant entities (i.e., the sending and receiving entities). A negative feedback tuple may not always indicate a problem, may nonetheless enable the entities involved to determine if there is a problem. For example, if an external data source receives a negative feedback tuple indicating no data flow, but the external data source has been sending data consistently to the application, then the external data source can determine that a problem does exist. In contrast, if the external data source was not sending data to the application, then the external data source would not consider the negative feedback tuple to represent a problem.

As will become apparent below, the defined time interval that may trigger a negative feedback tuple can vary based upon a number of factors, e.g., based upon the expected or normal flow rate for a stream, or based upon an application setting.

A negative feedback tuple may also be communicated in response to a detected deviation from a normal or expected flow rate for a stream computing application. The normal or expected flow rate, for example, may be determined adaptively throughout the life of an application, and deviations from the expected flow rate (e.g., a deviation greater than X %), negative feedback tuples may be sent to sending and receiving entities to allow them to determine if a problem exists. It will be appreciated that the expected flow rate may not be a fixed value in some embodiments, and further, may not be the same in all situations. For example, in some embodiments, expected flow rates may be determined for different times of the day, different days, or based on other factors. Further, expected flow rates may change over the history of a stream computing application, e.g., as the amount of data it ingests grows over time.

Figure 8:
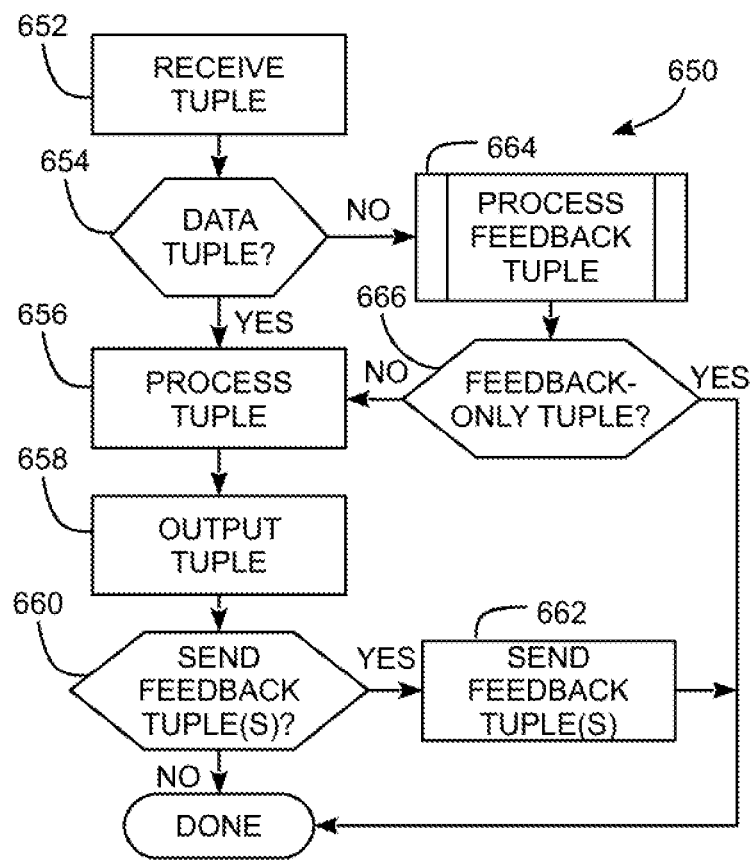
FIG. 8 illustrates an example sequence of operations for processing a tuple with the computing infrastructure of FIG. 1.

Now turning to FIG. 8, this figure illustrates an example generalized tuple processing routine 650, e.g., as implemented for a particular stream operator. Routine 650 may be at least partially implemented, for example, by stream runtime 250 in a compute node 110, although in some embodiments, routine 650 may be implemented within a stream operator or processing element, in an operating system, or in other appropriate program code utilized by a stream computing application. It will also be appreciated that routine 650 may be dedicated to handling tuples communicated to a single stream operator, external data source, external data sink, or other entity associated with a stream computing application in some embodiments, or routine 650 may be used to handle tuples communicated to multiple entities in other embodiments (e.g., all entities associated with a processing element, all entities associated with a compute node, etc.)

Stream runtime 250, as noted above, may be distributed among multiple compute nodes and/or processing elements, and operate as a framework for the stream computing environment, and as such, it will be appreciated that different aspects of the routines described herein may be distributed among multiple framework components executing on various processors within a stream computing environment. In the illustrated embodiment, for example, stream runtime 250 may be configured to primarily manage the generation, sending and receiving of feedback tuples, as well as perform other various data flow anomaly detection, identification and/or management functions for the various entities in a stream computing application, rather than performing such operations within the entities themselves. In other embodiments, however, other architectures may be used, so the invention is not limited to the particular framework architecture described herein.

For the purposes of the illustrated embodiment, routine 650 may be considered to be associated with a specific entity (e.g., a stream operator, external data source or external data sink), and may be called, for example, in response to receipt of a tuple specifying the associated entity as a destination thereof. Routine 650 begins in block 652 by receiving the tuple, and block 654 determines whether the tuple is a data tuple. If so, block 654 passes control to blocks 656 and 658 to implement the standard application-specific operations performed on data tuples in a stream computing environment. In particular, block 656 processes the data tuple, and block 658 outputs the data tuple. In association with processing the data tuple, one or more operations are generally performed on the data tuple, which may result in one or more attributes being added, deleted or modified. Processing the data tuple may include passing the tuple or data associated therewith to the associated entity for the routine (e.g., a stream operator, external data source, external data sink, etc.) and then receiving the results of the operations performed by the entity. As noted above, outputting the data tuple may result in the generation of one or more new output tuples that are passed to one or more stream operators or other entities coupled to the associated entity by the operator graph.

Next, block 660 determines whether one or more feedback tuples should be sent. In particular, as noted above, it may be desirable to send positive feedback tuples at substantially regular intervals to provide flow status information to various entities associated with a stream computing application. The positive feedback tuples may be communicated both upstream and downstream from a particular entity in some embodiments, while in other embodiments, positive feedback tuples may only be communicated upstream, or may only be communicated downstream. In still other embodiments, whether positive feedback tuples are communicated upstream, downstream, or not at all may be determined on an entity-by-entity basis. For the purposes of the illustrated embodiment, it will be assumed that positive feedback tuples are communicated both upstream and downstream of each entity.

Block 660 may specify a condition that determines when positive feedback tuples should be sent, e.g., a condition based upon a feedback rate established for the associated entity. For example, the feedback rate may specify sending positive feedback tuples every N data tuples (e.g., every 100,000 data tuples) in some instances. The feedback rate may also be configured in some embodiments to be proportional to a flow rate for data tuples processed by the associated entity. In other embodiments, however, the feedback rate may be based on time (e.g., every 300 milliseconds) rather than on numbers of data tuples, whereby data flow anomalies may be detected in part based upon counting the number of tuples communicated between successive positive feedback tuples. Moreover, as will be discussed in greater detail below, the feedback rate may by dynamically adapted during the execution of a stream computing application in some embodiments.

Thus, if the condition specified in block 660 is met, control passes to block 662 to send one or more positive feedback tuples. For example, in some embodiments positive feedback tuples may be communicated to each immediately neighboring upstream and downstream entity in the operator graph. If the condition specified in block 660 is not met, however, block 662 may be bypassed.

Returning to block 654, if the received tuple is not a data tuple, but is instead a feedback tuple, control passes to block 664 to process the feedback tuple, in a manner discussed in greater detail below. Block 666 then determines if the tuple is a feedback-only tuple, and thus does not also function as a data tuple. If not, control passes to block 656 to process the feedback tuple as a data tuple, otherwise routine 650 is complete. In other embodiments, feedback tuples may not support dual use as data tuples, so block 666 may be omitted in such embodiments.

Figure 9:
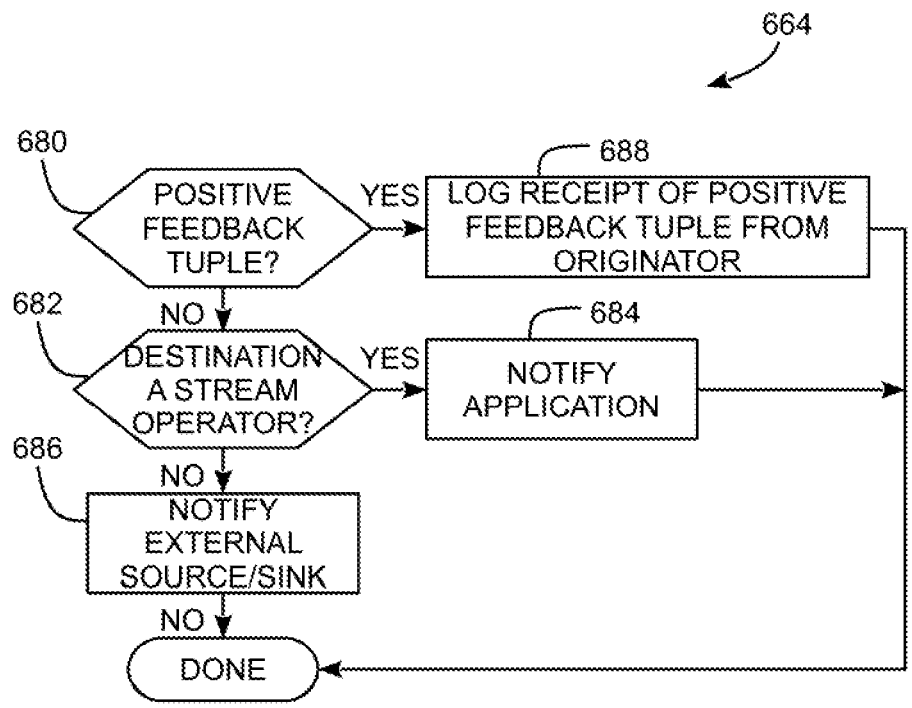
FIG. 9 illustrates an example sequence of operations for implementing the process feedback tuple block referenced in FIG. 8.

FIG. 9 next illustrates an example implementation of process feedback tuple block 664 referenced in FIG. 8, and which is capable of processing both positive and negative feedback tuples. In other embodiments, separate routines may be used to handle different types of feedback tuples.

Block 680 first determines whether the received feedback tuple is a positive or negative feedback tuple. If a negative feedback tuple, control passes to block 682 to determine whether the destination of the feedback tuple (i.e., the entity receiving the feedback tuple) is a stream operator. If so, control passes to block 684 to notify the stream computing application, and if not, the entity is an external data source or sink, so control passes to block 686 to notify the external data source or sink. As noted above, a negative feedback tuple may or may not indicate an actual data flow anomaly in some embodiments, and as such, notification of a stream computing application or external data source or sink enables further processing to be performed as needed to identify and/or handle a data source anomaly, as well as to disregard feedback tuples that are not indicative of data flow anomalies. It will also be appreciated that notifying an application or external data source or sink may utilize a specific protocol associated with a particular entity, and may in some instances include establishing a network connection to the entity if appropriate.

Returning to block 680, if the received feedback tuple is a positive feedback tuple, control passes to block 688 to log receipt of the positive feedback tuple from the originator of the positive feedback tuple. In some embodiments, for example, flow status information such as a timestamp, sequence number, identifier, etc. of the last positive feedback tuple received from each immediately neighboring entity in the operator graph may be maintained in a log, such that any failures to timely receive positive feedback tuples from any such entities may be detected. Other information suitable for use in detecting when data flow has stopped, slowed, increased or otherwise varied from an expected rate may be used in other embodiments.

Figure 10:
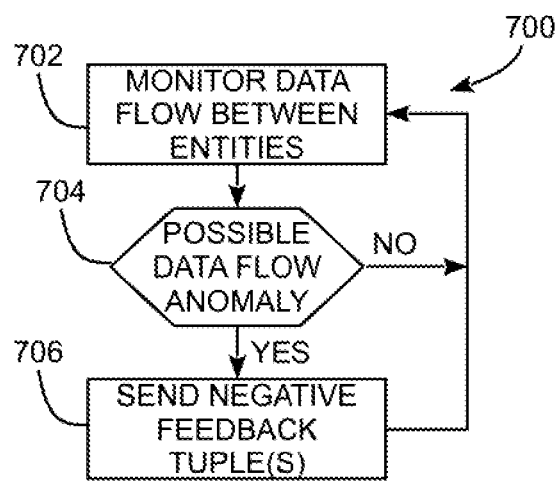
FIG. 10 illustrates an example sequence of operations for monitoring data flow with the computing infrastructure of FIG. 1.

FIG. 10 next illustrates an example routine 700 for monitoring data flow and generating negative feedback tuples in connection with potential data flow anomalies. Routine 700 may be executed, for example, for each entity associated with a stream computing application, and may execute block 702 to monitor the data flow between such entities. At various intervals, block 704 may be executed to determine if any possible data flow anomaly has been detected from the monitored data flow, and if not, control may return to block 702 to continue monitoring. Otherwise, if a possible data flow anomaly is detected, block 704 may pass control to block 706 to send one or more negative feedback tuples, e.g., to specific entities or to each entity immediately neighboring an entity in the operator graph, thereby providing flow status information to such entities.

As mentioned above, negative feedback tuples may be generated any time a data flow anomaly is potentially detected in various embodiments. As one example, zero data flow across a stream over a defined time interval may trigger generation of negative feedback tuples that are communicated both upstream and downstream from a particular entity. Negative feedback tuples do not always indicate a problem, but they do allow the entities involved to better determine if there is a problem. Thus, for example, if an external data source receives a negative feedback tuple indicating no data flow, but the external data source has been sending data consistently to the application, then it can be determined that a data flow anomaly exists. In contrast, if the external data source has intentionally halted sending data, the negative feedback tuple could be disregarded due to the fact that the lack of data flow is not due to any anomaly.

In various embodiments, the time intervals that may trigger negative feedback tuples may vary by stream, and may be dynamically adaptable based upon the expected or normal flow rate over a stream. Time intervals may also be explicitly set by an application in some embodiments.

FIG. 11 next illustrates an example routine 720 for monitoring positive feedback tuple logs, e.g., for each entity that is immediately neighboring an associated entity in the operator graph. Block 722, for example, may monitor the positive feedback tuple logs, and block 724 may regularly attempt to determine if any logs indicate a possible data flow anomaly. In some embodiments, for example, each log may maintain a timestamp or other unique identifier associated with a last received positive feedback tuple for a particular entity, such that if a positive feedback tuple is not timely received from the particular entity (e.g., over some expected window), that failure to timely receive the positive feedback tuple may be used detect a potential data flow anomaly. For example, a time-based threshold may be used in some embodiments such that a data flow anomaly is signaled if no positive feedback tuple has been received within N seconds or milliseconds from a last positive feedback tuple. More generally, a possible data flow anomaly for an entity may be detected in response to a failure to receive positive feedback tuples from another entity at an expected rate, e.g., where positive feedback tuples are not received at all, or where a rate at which such positive feedback tuples are received differs appreciably from an expected rate.

If no data flow anomaly has been detected, block 724 returns control to block 722. However, if a possible data flow anomaly has been detected, control passes to block 726 to determine whether the destination of the positive feedback tuple (i.e., the entity receiving the positive feedback tuple) is a stream operator. If so, control passes to block 728 to notify the stream computing application, and if not, the entity is an external data source or sink, so control passes to block 730 to notify the external data source or sink. Control then returns to block 722 to continue monitoring.

FIG. 12 illustrates an example routine 740 for handling notifications by an entity such as a stream operator, an external data source or an external data sink, e.g., as may be generated by any of blocks 684, 686, 728 or 730 of FIGS. 9 and 11. Block 742 receives the notification, and block 744 analyzes the notification. Block 746 determines based on the analysis whether an actual data flow anomaly exists, and if so passes control to block 748 to take corrective action. Otherwise, block 748 is bypassed and the notification is effectively ignored.

It will be appreciated that the functionality in routine 740 may vary considerably in different embodiments, and may include various application or implementation-specific operations to detect, identify and/or handle data flow anomalies. One example discussed above is that of an external data source that has intentionally halted data transmissions to a stream computing application, whereby the analysis performed by the external data source may determine that a notification indicating that no data flow has been received from the external data source is not an actual data flow anomaly. Further, various types of corrective actions may be taken in block 748, e.g., to generate an interrupt, message or alert to a system or operator indicating the anomaly, to log the anomaly, to halt execution, to reboot one or more compute nodes, to restart all or a portion of a stream computing application and/or entity, to reestablish a connection, etc.

FIG. 13 next illustrates an example routine 760 for dynamically adapting a feedback rate. As mentioned above, the feedback rate used to determine when to send positive feedback tuples may be dynamically adapted in some embodiments, e.g., based upon historical data flow. Block 762, for example, may monitor a data flow rate between various entities, and block 764 may regularly determine whether to adjust a feedback rate. If the feedback rate is to be adjusted, control may pass to block 766 to adjust the feedback rate, and then return control to block 762 to continue monitoring. If not, block 766 may be bypassed.

The trigger for adjusting the feedback rate may vary in different embodiments. For example, in some embodiments, the feedback rate may be adjusted if the current data flow rate varies more than N percent from a prior data flow rate from which the feedback rate was previously determined. In some embodiments, the feedback rate may be varied for different times of day, days of the week, or based on other factors. Thus, for example, if a particular stream between two entities has an average data flow rate of 100,000 data tuples per second from 6 am to 6 pm every weekday, but drops to 10,000 data tuples per second otherwise, it may be desirable in some embodiments to have the feedback rate vary between 1 per 200,000 and 1 per 20,000 during these different time frames to maintain a relatively constant stream of positive feedback tuples over the stream even as the data flow rate varies over the course of each day. Further, if, for example, a period of exceptionally high data flow rate occurs, it may be desirable to further decrease the feedback rate to appropriately balance responsiveness and overhead concerns.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof in the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, ondemand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to example embodiments, other and further embodiments of the disclosure may be devised without departing from the basic scope thereof, and the scope thereof is determined by the claims that follow.

What is claimed is:

1. A method for processing a stream of tuples in a stream computing environment, the method comprising:
   receiving a stream of tuples to be processed by a plurality of stream operators organized into an operator graph and disposed in a plurality of processing elements operating on one or more computer processors;
   in a first stream operator among the plurality of stream operators, processing a plurality of data tuples received from the stream of tuples; and
   communicating a feedback tuple from the first stream operator to an upstream entity coupled to the operator graph to provide flow status information to the upstream entity, wherein:
      the upstream entity is positioned in a direction opposite to a flow of the data tuples;
      the feedback tuple includes a positive feedback tuple; and
      communicating the positive feedback tuple comprises communicating the positive feedback tuple from the first stream operator to the upstream entity based upon a feedback rate, and wherein the method further comprises detecting a possible data flow anomaly for the upstream entity in response to a failure to timely receive a positive feedback tuple from the first stream operator.

2. The method of claim 1, wherein the upstream entity is a second stream operator among the plurality of stream operators, and the upstream entity is immediately neighboring the first stream operator in the operator graph.

3. The method of claim 1, wherein the upstream entity is an external data source.

4. The method of claim 1, further comprising communicating a second feedback tuple from the first stream operator to a downstream entity coupled to the operator graph to provide flow status information to the downstream entity.

5. The method of claim 4, wherein the downstream entity is a second stream operator among the plurality of stream operators.

6. The method of claim 5, wherein the downstream entity is immediately neighboring the first stream operator in the operator graph, and the downstream entity is positioned in a same direction of the flow of the data tuples.

7. The method of claim 4, wherein the downstream entity is an external data sink.

8. The method of claim 4, wherein the second feedback tuple is a dual use tuple including one or more attributes, the method further comprising processing the second feedback tuple as a data tuple with the downstream entity.

9. The method of claim 1, wherein the feedback rate is configured to be substantially proportional to a flow rate for data tuples processed by the first stream operator.

10. The method of claim 1, further comprising:
monitoring a flow rate for data tuples processed by the first stream operator; and
dynamically adapting the feedback rate in response to the monitored flow rate.

11. The method of claim 1, further comprising logging receipt of positive feedback tuples by the upstream entity and from the first stream operator.

12. The method of claim 1, wherein the feedback tuple includes a plurality of feedback tuples including the positive feedback tuple and a negative feedback tuple, and wherein communicating the feedback tuple further comprises communicating the negative feedback tuple from the first stream operator to the upstream entity to indicate a possible data flow anomaly in response to monitoring of data flow between the first stream operator and the upstream entity.

13. The method of claim 11, further comprising:
detecting a possible data flow anomaly based upon the feedback tuple;
notifying the upstream entity in response to detecting the possible data flow anomaly;
determining whether an actual data flow anomaly exists with the upstream entity in response to notifying the upstream notification; and
performing a corrective action with the upstream entity in response to determining that an actual data flow anomaly exists.

14. The method of claim 1, wherein the flow status information is stored as metadata in the feedback tuple.

15. The method of claim 1, wherein communicating the feedback tuple from the first stream operator to the upstream entity is performed by a stream runtime.

16. An apparatus, comprising:
one or more computer processors;
a memory coupled to the one or more computer processors, the memory comprising a plurality of processing elements, the memory configured to:
receive a stream of tuples to be processed by a plurality of stream operators organized into an operator graph and disposed in the plurality of processing elements, the plurality of processing elements configured to operate on the one or more computer processors; and
the memory further comprising program code configured upon execution by the one or more computer processors to:
in a first stream operator among the plurality of stream operators, process a plurality of data tuples received from the stream of tuples; and
communicate a feedback tuple from the first stream operator to an upstream entity coupled to the operator graph to provide flow status information to the upstream entity, wherein:
the upstream entity is positioned in a direction opposite to a flow of the data tuples;
the feedback tuple includes a positive feedback tuple; and
communication of the positive feedback tuple includes:
communication of the positive feedback tuple from the first stream operator to the upstream entity based upon a feedback rate; and
detection of a possible data flow anomaly for the upstream entity in response to a failure to timely receive a positive feedback tuple from the first stream operator.

17. A program product for processing a stream of tuples in a stream computing environment, the program product comprising a non-transitory computer readable storage medium having program code embodied therewith, the program code comprising computer readable program code configured to:
receive a stream of tuples to be processed by a plurality of stream operators organized into an operator graph and disposed in a plurality of processing elements operating on one or more computer processors;
in a first stream operator among the plurality of stream operators, process a plurality of data tuples received from the stream of tuples; and
communicate a feedback tuple from the first stream operator to an upstream entity coupled to the operator graph to provide flow status information to the upstream entity, wherein:
the upstream entity is positioned in a direction opposite to a flow of the data tuples;
the feedback tuple includes a positive feedback tuple; and
communication of the positive feedback tuple includes:
communication of the positive feedback tuple from the first stream operator to the upstream entity based upon a feedback rate; and
detection of a possible data flow anomaly for the upstream entity in response to a failure to timely receive a positive feedback tuple from the first stream operator.

18. The method of claim 1, wherein the feedback tuple includes metadata identifying the tuple as a feedback tuple, thereby distinguishing the feedback tuple from a data tuple.

19. The method of claim 1, wherein communicating the feedback tuple includes communicating the positive feedback tuple from the first stream operator to each upstream and downstream entity coupled to the operator graph and immediately neighboring the first stream operator.

* * * * *